(12) United States Patent
Barbeau et al.

(10) Patent No.: US 8,249,807 B1
(45) Date of Patent: Aug. 21, 2012

(54) METHOD FOR DETERMINING CRITICAL POINTS IN LOCATION DATA GENERATED BY LOCATION-BASED APPLICATIONS

(75) Inventors: Sean Barbeau, Tampa, FL (US); Philip L. Winters, Tampa, FL (US); Rafael Perez, Temple Terrace, FL (US); Miguel Labrador, Tampa, FL (US); Nevine Georggi, Valrico, FL (US)

(73) Assignee: University of South Florida, Tampa, FL (US)

( * ) Notice: Subject to any disclaimer, the term of this patent is extended or adjusted under 35 U.S.C. 154(b) by 625 days.

(21) Appl. No.: 12/196,673

(22) Filed: Aug. 22, 2008

Related U.S. Application Data

(60) Provisional application No. 60/957,299, filed on Aug. 22, 2007.

(51) Int. Cl.
*G01C 21/00* (2006.01)
(52) U.S. Cl. ........ 701/490; 701/433; 701/467; 701/508; 701/408; 340/990
(58) Field of Classification Search .................. 701/117, 701/200, 433, 431, 467, 508; 455/418, 456; 340/990; 342/357.51
See application file for complete search history.

(56) References Cited

U.S. PATENT DOCUMENTS

| | | | | |
|---|---|---|---|---|
| 6,360,162 B1* | 3/2002 | Meis et al. | ..................... | 701/117 |
| 6,952,180 B2* | 10/2005 | Jonsson et al. | ............ | 342/357.51 |
| 7,369,845 B2* | 5/2008 | Keohane et al. | .............. | 455/418 |
| 7,480,513 B2* | 1/2009 | Woo | ........................... | 455/456.6 |
| 7,653,484 B2* | 1/2010 | Choi | ............................. | 701/210 |
| 2002/0115436 A1 | 8/2002 | Howell et al. | | |
| 2003/0083805 A1* | 5/2003 | Stefan et al. | .................. | 701/200 |
| 2008/0085724 A1 | 4/2008 | Cormier et al. | | |
| 2010/0082235 A1* | 4/2010 | Dicke et al. | ................... | 701/206 |
| 2010/0204912 A1* | 8/2010 | Ros | ............................... | 701/200 |

OTHER PUBLICATIONS

Leonhardi, A.; Nicu, C.; Rothermel, K. 2002. A Map-based Dead-reckoning Protocol for Updating Location Information. Proceedings of the International Parallel and Distributed Processing Symposium.
Treu, G.; Kupper, A.; Wilder, T. 2007. Extending the LBS-framework TraX: Efficient proximity detection with dead reckoning. Computer Communications. 31:1040-1051.

(Continued)

*Primary Examiner* — Gerald J. O'Connor
*Assistant Examiner* — Jonathan K Ng
(74) *Attorney, Agent, or Firm* — Molly L. Sauter; Smith & Hopen, P.A.

(57) ABSTRACT

Provided is a critical point method used to determine the points of a real-time stream of location data, such as Global Positioning System (GPS) data, that should be retained based on their importance in reconstructing the travel path of a mobile device. The method may run on a mobile device or on a server. When run on a mobile device, the method reduces the amount of data transferred between mediums by only transferring points that are critical to reconstructing the path of travel of the mobile device. This reduction saves power used in the wireless transmission and reception of the non-critical data and the bandwidth used while transmitting non-critical data. The method may be run every time a new position is calculated. When a new position is determined to be a critical point, the point is transmitted. If the new position is not a critical point, then the point is discarded.

33 Claims, 7 Drawing Sheets

OTHER PUBLICATIONS

Shi, W.; Cheung, C. 2006. Performance Evaluation of Line Simplification Algorithms for Vector Generalization. The Cartographic Journal. 43(1) 27-44.

Aguilar et al., Quantifying Position Accuracy of Multimodal Data from Global Positioning System-Enabled Cell Phones, Transportation Research Record: Journal of the Transportation Research Board, 2007, No. 1992, pp. 54-60.

Ballantyne et al., Power Down: Achieving Low Energy-Per-Fix in Cell Phones, GPS World, The Business and Technology of Global Navigation and Positioning, Jul. 1, 2006, pp. 1-4.

Winters et al., Traveling Smart: Increasing Transit Ridership Through Automated Collection (TRAC) of Individual Travel Behavior Data and Personalized Feedback, Technical Report, National Center for Transit Research, Center for Urban Transportation Research, University of South Florida, Aug. 2005, pp. 1-119.

Personal Locator Services to Reach More than 20 Million North American Consumers by 2011, ABI Research, New York, Nov. 27, 2006, http://www/abiresearch.com/press/766, accessed Sep. 7, 2011.

Barbeau et al., A General Architecture in Support of Interactive, Multimedia, Location-Based Mobile Applications, IEEE Communications Magazine, Nov. 2006, vol. 44, No. 11, pp. 156-163.

Murakami et al., Using Global Positioning Systems and Personal Digital Assistants for Personal Travel Surveys in the United States, International Conference on Transport Survey Quality and Innovation, Jul. 2004.

Aguilar, A Framework for Evaluating the Computational Aspects of Mobile Phones, Theses and Dissertations, University of South Florida, Jun. 1, 2008.

Leonhardi et al., Protocols for Updating Highly Accurate Location Information, Geographic Location in the Internet, Kluwer Academic Publishers, 2002, pp. 111-141.

Murakami et al., Can Using Global Positioning System (GPS) Improve Trip Reporting?, Transportation Research Part C vol. 7, No. 2-3, 1999, pp. 149-165.

Toole-Holt et al., Two Minutes per Person per Day Each Year, Exploration of Growth in Travel Time Expenditures, Transportation Research Record: Journal of the Transportation Research Board, 2005, No. 1917, pp. 45-53.

Wolfson et al., Updating and Querying Databases that Track Mobile Units, Distributed and Parallel Databases, 1999, vol. 7, No. 3, pp. 257-387.

Sun Microsystems, Connected Limited Device Configuration (CLDC); JSR 139, http://java.sun.com/products/cldc, accessed Sep. 7, 2011.

Sun Microsystems, Java Specification Request (JSR) 179: Location API for J2ME(tm), http://jcp.org/en/jsr/detail?id=179, accessed Sep. 7, 2011.

Wolf et al., Elimination of the Travel Diary: An Experiment to Derive Trip Purpose From GPS Travel Data, Transportation Research Record, vol. 1768, May 3, 2005, pp. 125-134.

Guensler et al., Development of a Handheld Electronic Travel Diary for Monitoring Individual Tripmaking Behavior, Transportation Research Board 78th Annual Conference, Washington, D.C. Jan. 1999.

Draijer et al., Global Positioning System as Data Collection Method for Travel Research, Transportation Research Record, 2000, vol. 1719, pp. 147-153.

Asakura et al., Monitoring Individual Travel Behaviour Using PEAMON: a Cellular Phone Based Location Positioning Instrument Combined with Acceleration Sensor, Institute of Urban Transport Planning Co. Ltd., Osaka, Japan, 2001, pp. 1-11.

* cited by examiner

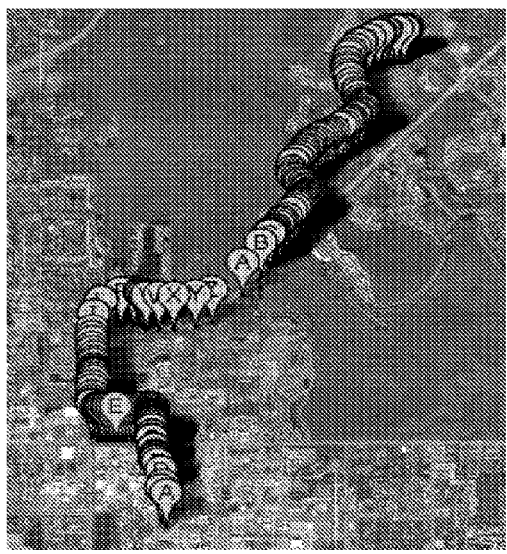
FIG. 6A
FIG. 6B
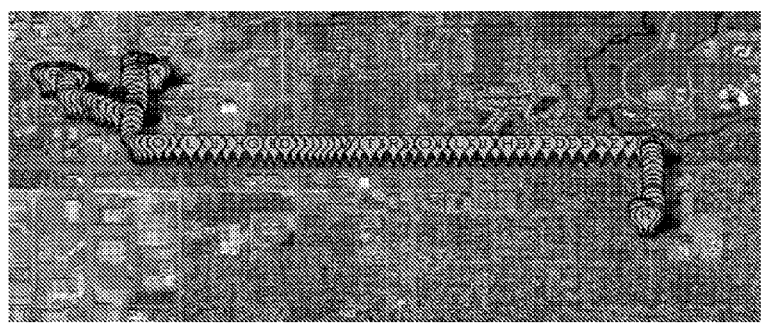
FIG. 7A
FIG. 7B

| Trip | Number of LDPs | Number of CPs | Percentage of LPDs Transmitted | Bytes Saved | Financial Savings* |
|---|---|---|---|---|---|
| 1 | 73 | 26 | 35.61% | 5,593 | $0.17 |
| 2 | 363 | 56 | 15.42% | 36,533 | $1.10 |
| 3 | 489 | 65 | 13.29% | 50,456 | $1.50 |
| 4 | 208 | 73 | 35.09% | 16,065 | $0.48 |
| 5 | 357 | 62 | 17.37% | 35,105 | $1.05 |
| 6 | 2330 | 159 | 6.80% | 257,159 | $7.71 |
| 7 | 1022 | 139 | 13.60% | 105,077 | $3.15 |
| 8 | 811 | 137 | 16.89% | 80,206 | $2.40 |

*Based on 119 bytes per UDP package and a charge of $0.03 per kilobyte

FIG. 8

METHOD FOR DETERMINING CRITICAL POINTS IN LOCATION DATA GENERATED BY LOCATION-BASED APPLICATIONS

CROSS REFERENCE TO RELATED APPLICATIONS

This application claims priority to currently U.S. Provisional Patent Application No. 60/957,299, filed Aug. 22, 2007.

STATEMENT OF GOVERNMENT INTEREST

This invention was made with Government support under Grant No. 2117770900 and FDOT BD WO#35 awarded by the Florida Department of Transportation. The Government has certain rights in the invention.

FIELD OF INVENTION

This invention relates to wireless communication devices and, in particular, transmitting only necessary location data, such as GPS fixes, from one medium to another, such as from a mobile device to a server.

BACKGROUND

The transportation capacity of urban environments serves as an integral function in modern society. Many transportation infrastructures are stretched to their limits as, every day, an increasing number of people travel on highways. The Transportation Demand Management (TDM) industry seeks to provide a solution to congested thoroughfares by using existing roads more efficiently through the adjustment of commuter travel behavior. This approach to building new roads has the added advantages of reducing congestion, air pollution, and fossil fuel consumption as well as providing mobility solutions for non-drivers.

To provide effective solutions for increased demand, TDM strategies require an in-depth understanding of the local area's transportation patterns. In the past, transportation experts have relied on self-reporting paper and/or phone surveys to analyze trip characteristics including start and end times, duration, distance, origin, destination, purpose, mode, etc. However, these types of surveys have several intrinsic problems. First, the amount of time and effort required to complete an accurate travel survey is significant. As a result, recruiting participants is challenging; often the length of the study must be limited to one or two days to avoid placing an undue burden on respondents. Second, the desired level of detail and accuracy are impeded by self-reporting user errors, apathy, and intentional or unintentional omissions, particularly on short trips. Finally, once the surveys are collected, they must be manually post-processed, thus requiring a significant amount of time and effort.

In recent years, modern computing devices including Global Positioning System (GPS)-enabled mobile phones have been evaluated as possible replacements for paper and phone surveys. GPS-enabled mobile phones can be carried by the user whenever and wherever he or she travels, and provide the opportunity for recording an individual's transportation behavior for any mode of transportation, including travel via public transit, or non-motorized modes such as walking or biking. The objective nature of GPS data, combined with the automated data collection process, can enhance the quality and quantity of collected data. Mobile phones are also capable of transferring GPS data to a central database immediately upon collection, which allows for extended deployment of the survey. Real-time data connectivity also introduces new services to the traveler such as highly targeted traffic alerts based on the user's real-time location and predicted destination. These services help to reduce traffic congestion while providing the user an incentive to allow their travel behavior to be monitored.

One of the most important travel characteristics obtained from GPS data is the user's route (i.e., the path that he or she takes from source to destination). Although route information can be easily obtained without the user's intervention by continuously calculating and sending GPS fixes from the cell phone to a server, this method will quickly drain energy from the cell phone's battery. When tracking for an entire day is desired, power consumption becomes a significant concern that can render a mobile phone inoperable if resources are not managed properly by the application. Furthermore, frequent transmission of unnecessary information not only increases the cost of the user's phone bill, but also utilizes additional network resources. To solve these problems while retaining the ability to continue tracking the user and reconstructing the user's path, new dynamic application-level location management algorithms are required.

In terminal-based location methods in which the mobile device is the primary position-calculating entity, the device location must be sent to a server to update the system with real-time position information. Many methods for sending mobile device positioning updates to a server have been discussed in existing literature, including polling, zone updates, distance updates, and dead reckoning.

In polling, a server pulls the position from the mobile device on a periodic basis, or as requested by the server-side location-based application. Polling is useful for occasional position updates, such as displaying the current location of devices on a map, but is not efficient for real-time applications with on-board intelligence that relies upon real-time position information, or for detailed route recording. Periodic updates are sent from the mobile device to the server after a fixed interval of time elapses. While it is one of the most commonly used update methods, a significant amount of unnecessary data can be sent to the server when small interval values are used. Additionally, the specific fixed interval must be customized per application. While large time intervals are more efficient, they do not meet the needs of real-time or archival applications.

The mobile device can also send position updates based on zones and distance. In zone-based methods, the mobile device sends GPS fixes when it enters or leaves a particular geographic zone. Distance-based methods trigger a position update after the mobile phone has exceeded a distance threshold. These two methods must also be customized with a set interval per application, and tend to send more GPS fixes than necessary. Distance-based methods also send unnecessary location updates when the user is traveling in a straight line.

Dead reckoning is another method that determines whether to send a new GPS fix based on the most recent location data that was sent to the server, and an estimation function executed simultaneously on the device and the server. For example, if the device detects that its position deviates from what is expected when the estimation function is executed with the most recent server data, it then sends the new position to the server. While this method results in fewer transmissions to the server, it requires the continuous execution of potentially costly estimation functions on both the mobile device and the server. For significantly resource-constrained devices, such as those that meet the qualifications of the Java ME Connected Limited Device Configuration (CLDC), these estimation functions may consume significant resources and may not be feasible for real-time operation.

For tracking applications that run in the background on a mobile phone for an extended period of time, none of the above-described positioning update methods provide an efficient means to deliver both real-time Location-Based Services (LBS), as well as an accurate record of the user's travel path within the same application. Therefore, to achieve highly efficient LBS, a new method that dynamically adjusts at run-time is needed.

Many location-based applications are used to track users with Global Positioning System (GPS)-enabled mobile devices in real-time. However, the continuous calculation and transmission of GPS fixes from the mobile device to the main server consumes a considerable amount of energy and increases data transmission costs.

SUMMARY OF INVENTION

The invention includes a method of identifying critical points in a plurality of location data corresponding to a user's path of travel. In one embodiment the invention reduces the number of location data point (LDP) transmissions to a server for tracking applications that provide both real-time and archival recording features. The invention of this embodiment is capable of building an accurate representation of a user's path with a reduced number of fixes; thereby extending a mobile device's battery life.

The present invention comprises a critical point method, which dynamically adjusts at run-time to achieve more efficient Location-Based Services (LBS) than currently available update methods. In an embodiment of the present invention, the critical point method comprises obtaining a plurality of location data points (LDPs), reducing the plurality of LDPs to a series of connected lines, determining the vertices of the lines, and then transmitting the vertices of the lines to the main server.

BRIEF DESCRIPTION OF THE DRAWINGS

For a fuller understanding of the invention, reference should be made to the following detailed description, taken in connection with the accompanying drawings, in which:

FIGS. 6A and 6B are illustrations of a trip showing the reduction in points using the critical point method in accordance with an embodiment of the present invention. The transmitted location data points of the trip are shown without (FIG. 6A) and with (FIG. 6B) the critical point method implemented.

FIGS. 7A and 7B are illustrations of a second trip showing the reduction in points using the critical point method in accordance with an embodiment of the present invention. The transmitted location data points of the trip are shown without (FIG. 7A) and with (FIG. 7B) the critical point method implemented.

FIG. 8 is a chart showing the financial saving of data charges using the critical point method in accordance with an embodiment of the present invention.

DETAILED DESCRIPTION OF THE PREFERRED EMBODIMENT

Figure 1:
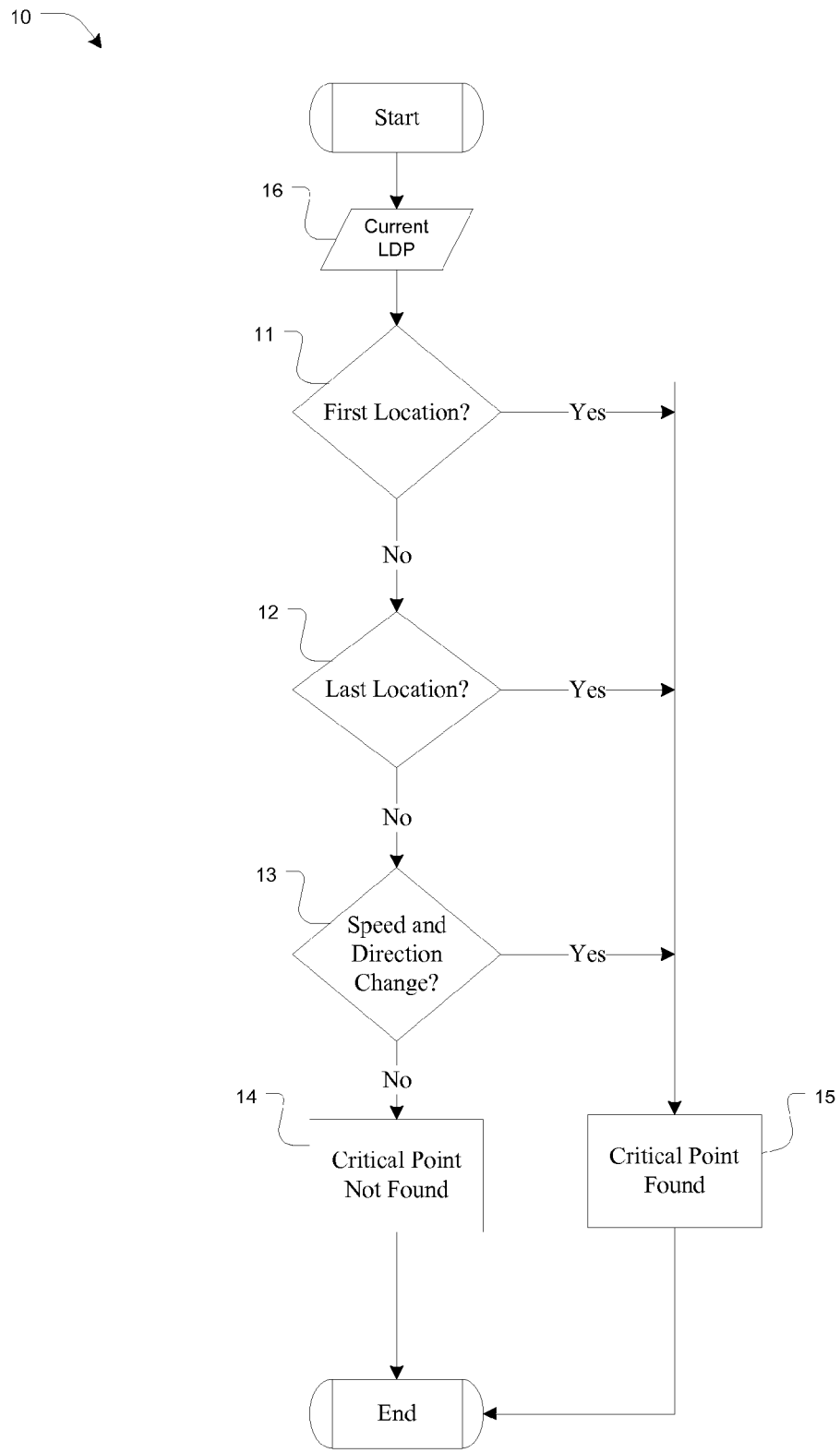
FIG. 1 is a diagram demonstrating how changes in the direction of a mobile device path are calculated from location data points in accordance with an embodiment of the present invention.

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

The invention of a first embodiment filters non-critical position data from of a plurality of location data, such as a continuous stream of real-time location data. Location data points (LDPs) include measurements containing latitude, longitude, and time-stamp information that represent the location of a mobile device at a particular moment in time. LDPs may also include other information such as altitude, estimated accuracy uncertainty, speed, and heading.

A critical point is an LDP necessary to construct an accurate representation of a user's travel path. Each travel path will have at least two critical points, a start point and an end point. Intermediate points may exist between any two critical points. Intermediate points may be critical or non-critical (discussed below). Although all points can be determined either in real-time or by post processing, it may be common for the last point to be determined in post-processing as the system may not have real-time knowledge that any given point is an end point.

Non-critical data points are redundant or useless data that do not contribute to the knowledge of the device path. A straight line, for example, will have only two critical points; the start point and the end point. Intermediate LDPs may exist between the start and end points so that a line drawn between them would intersect all the intermediate LDPs. These intermediate points are discarded because they do not contribute additional path information. Non-critical points can also include information gathered while a device is standing still (i.e., redundant location data), or data from fallback positioning technologies such as Cell ID (i.e., the center point location area of current cellular coverage) when GPS, or other positioning system, is not available. Positioning systems always include some uncertainty in measurements. Non-critical points therefore include LDPs that are close in proximity but contain the same basic position information.

The method can be operated on the mobile device with only the critical data points being added to travel data. In an illustrative embodiment the critical data points are then transmitted to an application server, such as over a wireless network. The invention of this embodiment thereby reduces battery consumption (i.e., energy costs to the device), bandwidth consumption (i.e., cost to the network), and the number of bytes transferred (i.e., cost to the user) by transferring only Critical points between entities in a LBS system.

In another embodiment, the method removes all non-critical data points from a plurality of location data points. In one variation of this embodiment a previously established plurality of location data points is filtered to remove all non-critical data points. In another variation, all LDPs are transmitted to the application server at which time the method is implemented.

The inventive method can run in real-time, process data from multiple positioning technologies (including assisted GPS), and dynamically adjust threshold values and filtering non-critical points based on real-time velocity measurements. The critical point method is executed each time a new position is calculated on a mobile device.

All methods of identifying non-critical data points, as described above, are contemplated. For example, it is possible to determine a non-critical data point in relation to a previously established critical data point. In one embodiment, a first critical data point is established (either by employing the method or by default as in the case of a start point). Upon receiving a subsequent LDP, the system compares the direction of travel at the subsequent LDP to the direction of travel at the first critical data point. The subsequent LDP is a critical point wherein the system detects a change in direction between the first critical point and the subsequent LDP. The change in direction can be determined by any means know in the art, such as relying on heading data obtained from GPS data.

In another embodiment, the method reduces a stream of LDPs, monitored in real time or during post-processing, into a series of connected lines. The LDPs corresponding to the vertices joining these lines are then designated as critical points. Intermediate points between critical points are discarded.

Example I

A simplified flowchart of an embodiment of method 10 is shown in FIG. 1. As it can be seen, method 10 takes current LDP 16 as input. Method 10 first determines if current LDP 16 is the first location 11 or last location 12. If current LDP 16 is either the first or the last LDP, then a critical point has been found 15 and the critical point is returned. If current LDP 16 is not the first or last LDP, then method 10 determines if current LDP 16 has changed direction 13. If so, then method 10 has found a critical point 15 and the critical point is returned. If not, then no critical point is found 14 and method 10 returns null.

Figure 2:
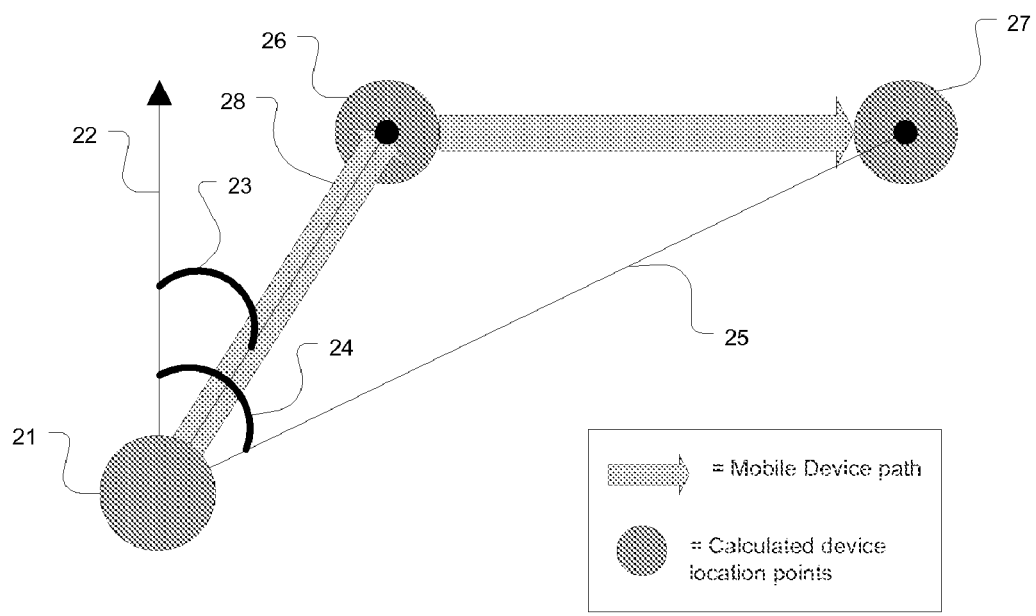
FIG. 2 is a simplified flowchart of the critical point method in accordance with an embodiment of the present invention.

Changes in direction (13, FIG. 1) can be detected by a difference in azimuth values between vectors and a reference plane. As shown in FIG. 2, method 10 compares the parameters of at least three LDPs: last critical point 21, last valid point 26 and current LDP 27. Current LDP 27 is the most recently calculated LDP, which will be near real-time. If data is being post-processed on a server, however, it will be the current point being analyzed while looping through the data set in the order in which the LDPs were collected. Last critical point 21 is the most recent point determined to be critical using method 10 (including a start point, which is a critical point by default). Last valid LDP 26 is the most recently recorded LDP that meets a certain criteria (e.g. has an accuracy uncertainty of less than thirty meters (i.e. highly accurate fix) or is calculated using a certain location technology, such as GPS, etc.).

First vector 28 is defined by the line between last critical point 21 and last valid LDP 26. Second vector 25 is defined by the line between last critical point 21 and current LDP 27. Azimuth values are determined by the angle between first vector 28, second vector 25 and reference plane 22. Therefore, first azimuth 23 is the angle between reference plane 22 and first vector 28, and second azimuth 24 between reference plane 22 and second vector 25. The change in direction is calculated by taking the absolute value of the difference between first azimuth 23 and second azimuth 24.

Example 2

In another embodiment, a new critical point is recorded only in response to an LDP which has at least one parameter surpassing a defined threshold. A speed threshold, for example, can be used to determine an appropriate minimum speed that should be used to filter out data when the device is not moving. LDPs whose speed parameter are below the speed threshold are designated as non-critical. This method filters redundant LDPs.

Example 3

In yet another embodiment, multiple speed thresholds are used to approximate the current mode of transportation. The mode of transportation is then used to dynamically establish an azimuth threshold. A large azimuth threshold value may be useful to optimize the method for walking speeds (i.e., less than five meters per second), and a smaller azimuth threshold may be useful for vehicle speeds (i.e., greater than five meters per second).

Figure 3:
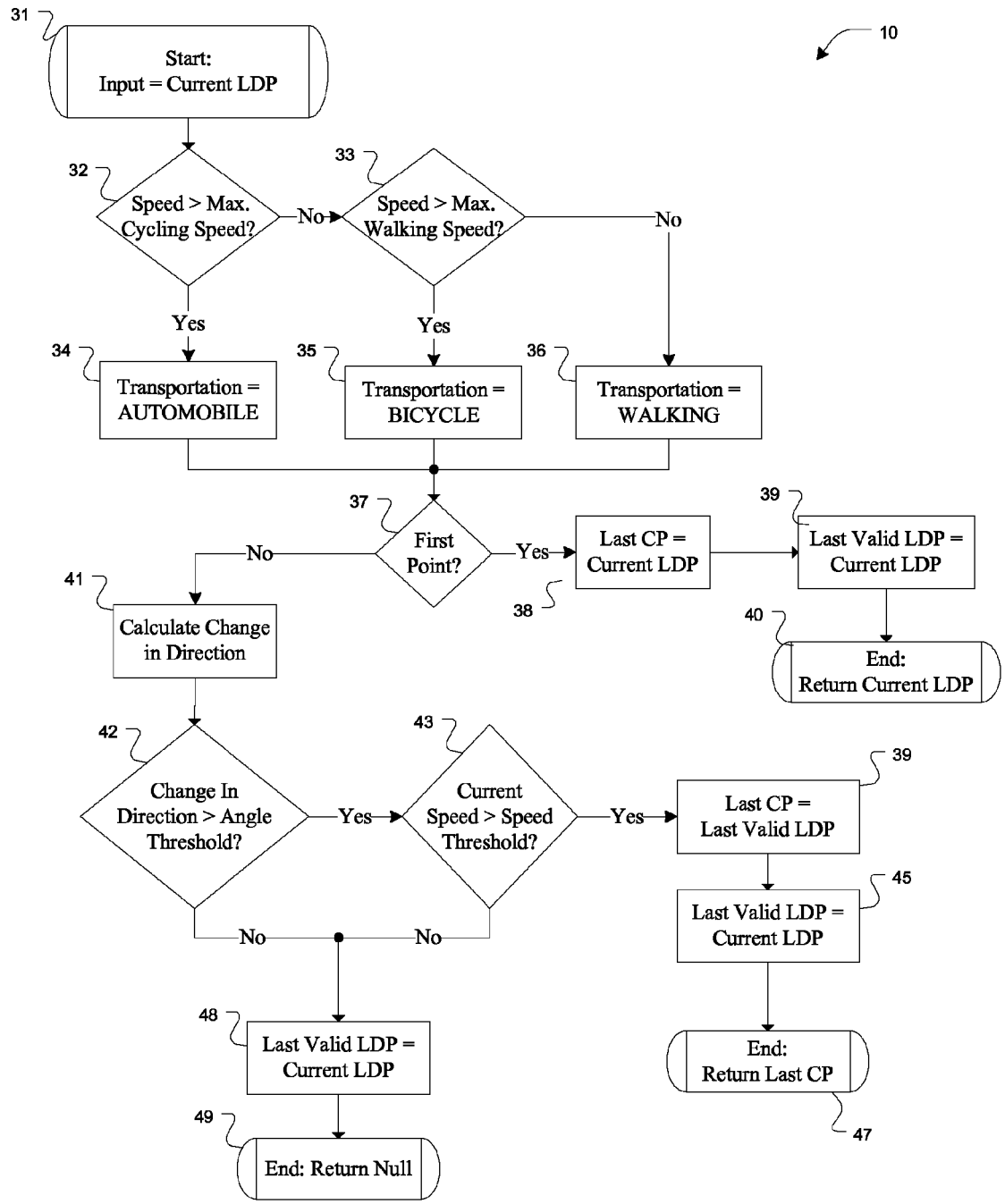
FIG. 3 is a detailed flowchart of the critical point method in accordance with an embodiment of the present invention.

A detailed flowchart of such an embodiment is shown in FIG. 3. An LBS application starts and begins to calculate its position at a fixed interval. Method 10 executes every time a new position is calculated, beginning with the start location. Method 10 also tracks last critical point (21), last valid LDP (26) and current LDP (27) as shown in FIG. 2. Last critical point (21) is initialized to null before method 10 runs for the first time and represents the last point in the sequence of points that was evaluated as a critical point. Last valid LDP (26) is also initialized to null before the method runs for the first time and represents the last point in the sequence of points that met a specific criteria (i.e. accuracy uncertainty below a certain value). Current LDP (27) is the most recently calculated point, which is passed into method 10 repeatedly, every time a new position is calculated. Each LDP may include latitude, longitude, speed, and other information.

The mode of transportation is then used to establish angle and speed thresholds. In first step 31, method 10 takes current LDP (27) as input. In steps 32 through 36, method 10 determines the speed of travel of the mobile device from the current LDP and then determines the mode of transportation. In step 32, speed is compared to a constant set for maximum cycling speed. If the device speed is greater than the max cycling speed, then an automobile is determined as the mode of transportation in step 34. If the device speed is less than cycling speed, then the speed is compared to the constant set for maximum walking speed in step 33. If the speed is greater than the maximum walking speed, then the mode of transportation is set to a bicycle in step 35. If the speed is less than the maximum walking speed, then the mode of transportation is walking in step 36. Other modes of transportation can be added to the method and maximum speeds for each mode of transportation can be changed.

Next, in step 37, method 10 determines whether the current LDP is the first point. If the current LDP is the first point, then the last critical point is set to the value of the current LDP in step 38 and then the last LDP is set to the value of the current LDP in step 39. In step 40, method 10 returns current LDP as critical point.

If the current LDP is not the first point, then the change in direction is calculated, as above for example, in step 41. In step 42 of this embodiment, the change in direction is compared to an angle threshold, which is the minimum change in azimuth when a point should be considered a critical point. A different angle threshold may be used to determine whether a LDP is a critical point based on the current speed and/or estimated mode of transportation. Therefore, the angle threshold may change based on the value of speed. A larger threshold can be used, for example, when the mobile device is moving at slow speeds (i.e. under 10 meters per second). Conversely, a smaller threshold can be used when the device is moving at high speeds (i.e. over 10 meters per second). Threshold values allow fine-tuning for the determination of critical points based on current environmental conditions, such as speed and mode of transportation.

If the value of the change in direction is determined in step 42 does not exceed the angle threshold, then the current LDP is not a critical point. Therefore, in step 48, the last valid LDP is set to the value of the current LDP, and then, in step 49, method 10 returns a null value. The value of the last critical point remains unchanged.

If the value of the change in direction is determined in step 42 exceeds the angle threshold, then the current speed is compared to the speed threshold in step 43. The speed threshold is the minimum speed at which the mobile device is considered to be moving. The speed threshold is used to eliminate the location data "noise" of positions close to the previously calculated position that may not reflect actual device movement. This often occurs with positioning technologies, such as GPS, when a mobile device is not moving.

If the current speed is determined to be below the speed threshold in step 43, then the current LDP is not a critical point. Therefore, in step 48, the last valid LDP is set to the value of the current LDP 48, and then, in step 49, method 10 returns a null value 49. The value of the last critical point remains unchanged.

If the current speed is determined to exceed the speed threshold in step 43, then a critical point has been determined; however, the critical point is not the current LDP, but the last valid LDP found by method 10. Therefore, in step 39, the last critical point is set to the value of the last valid LDP, and then, in step 45, the last valid LDP is set to the value of the current LDP. Finally, in step 47, method 10 returns the last critical point as a critical point.

After returning a value, method 10 will be called again by the LBS application with a newly calculated position, which will be the new current LDP passed into method 10.

Example 4

In yet another embodiment, the comparison of change in direction to angle threshold in step 42 and the comparison of current speed to the speed threshold in step 43, may be completed in the reverse order. For example, once the current LDP is determined not to be the first point in step 37, then the comparison between the current speed and speed threshold in step 43 occurs. If the current speed exceeds the speed threshold, then step 43 would then be followed the calculation of the change in direction in step 41 and then the comparison of the change in direction and angle threshold in step 42.

In another similar example, the calculation in direction of step 41 may be completed prior to the comparison of the current speed and speed threshold in step 43.

Example 5

In yet another embodiment, also illustrated by FIG. 3, a LBS application starts and begins to calculate its position at a fixed interval of four seconds. Method 10 executes every time a new position is calculated, beginning with the first LDP.

The first LDP is determined to be a critical point in step 37 and information about this position is then saved in steps 38 and 39 for use in a later iteration of method 10. Method 10 then returns the critical point to the application in step 40. The LBS application then transmits the critical point to a server for processing.

The mobile device then calculates a new position four seconds later, and the data is passed into method 10 in step 31 by the LBS application. Method 10 generates a null output in step 49 and no data will be sent by the LBS application to the server, as method 10 does not have enough information to determine whether this second point is a critical point. However, method 10 saves information about this fix for future calculations 48, which may determine that the point is a critical point.

The LBS application then calculates a third position, which is passed as input into method 10 in step 31. If the difference in the change in direction is determined to exceed the angle threshold in step 42 and the speed determined for the third position is found to exceed the speed threshold (i.e., the device is not stationary) in step 43, the second position is as a critical point and is returned by the algorithm in step 47. Information about the second and third position is then saved in step 39 and 45 for future iterations of method 10. The LBS application then sends the critical point, the second position, to the server.

If the angle threshold in step 42 or the speed threshold in step 43 thresholds is not exceeded, method 10 saves information about the second and third fixes in step 48, and generates a null result in step 49. In this case, because a null value is return to the LBS application, no fixes are sent to the server.

A fourth fix is then calculated by the LBS application and passed into method 10 in step 31. If the change in direction exceeds the angle threshold value in step 42, and the speed value for the fourth position exceeds speed threshold in step 43, then the third position is established as a critical point. The third position will be saved as the last critical point in step 39 and return to the LBS application in step 47. The LBS application will then send the critical point, the third position, to the server. Information about the third and fourth positions is saved in steps 39 and 45 for future iterations of method 10.

If the angle threshold of step 42 or the speed threshold of step 43 is not exceeded, then method 10 saves the information about the third and fourth positions in step 48 and returns a null result to the LBS application in step 49. Here, no positions are sent to the server as no critical points were found by method 10.

This process continues until the final position is calculated by the LBS application and passed through method 10. The final position is a critical point and will be the last critical point sent the server for that travel path.

Example 6

Figure 4:
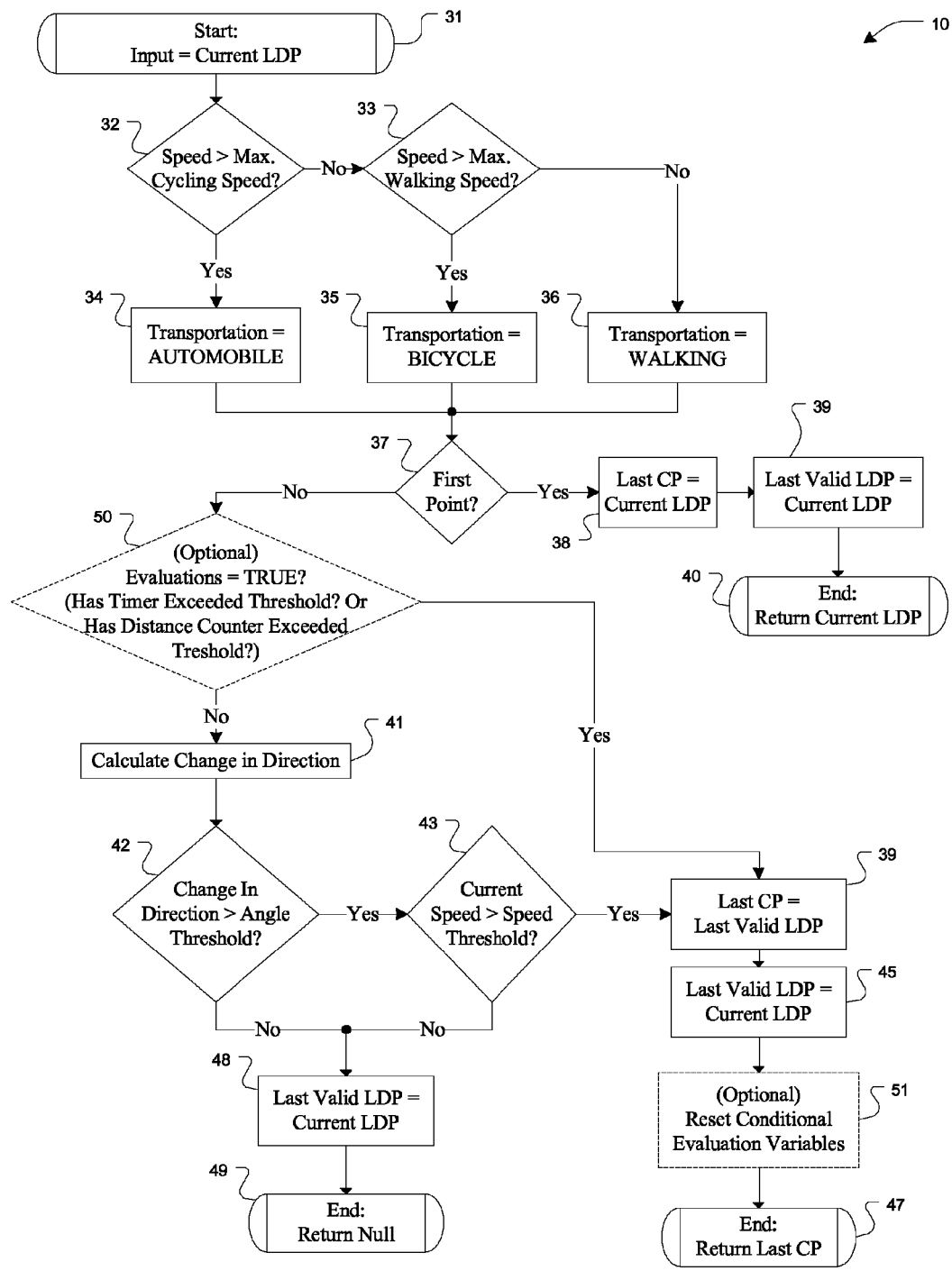
FIG. 4 is a detailed flowchart of the critical point method shown with optional evaluations in accordance with an embodiment of the present invention.

In yet another embodiment, several optional conditional evaluations can be completed by method 10. These evaluations are useful in real-time LBS applications, allowing method 10 to meet real-time constraints as needed and also maintaining the more efficient model when real-time features are not active (e.g., the user is inside a building and is not actively traveling). The optional conditional evaluations, including a timer, distance counter, and probing sensor, are described below and their placement is illustrated in the flowchart of FIG. 4. An embodiment of the critical point method may contain any number of optional evaluations or may not contain any optional evaluations at all.

The optional evaluations of step 50 may occur after the current LDP is determined not to be the first point in step 37 and before the change in direction is calculated in step 41. If no optional evaluations are performed or an optional evaluation returns a 'false' value, then method 10 continues on to calculate the change in direction in step 41. If an optional evaluation returns a 'true' value, then method 10 skips th calculation of change in direction in step 41, the comparison of change in direction and angle threshold in step 42, and the comparison of speed and speed threshold in step 43. Method 10 then saves the last valid LDP as the last critical point in step 39, saves the current LDP as the last valid LDP in step 45, and returns the last critical point in step 39. Prior to completion, method 10 also resets any conditional evaluation variables in step 51. This example placement of the evaluations of step 50 is not meant to be limiting and other placement and resulting sequences are anticipated.

In an embodiment, a timer is added to method 10 such that a LDP is established as a critical point and sent to the server after a certain amount of time elapses. This ensures that a position is reported at a minimum given interval, in case the device is stationary for long periods of time or traveling in a straight line for an extended period. For example, after thirty seconds, if a critical point has not been determined, then the next point obtained by the LBS application and passed into method 10 is considered a critical point. This can be viewed as a dynamic transition to a periodic location update method.

In another embodiment, a distance counter is added to method 10. The distance counter starts after a critical point is found. While the device is traveling in a straight line, the distance counter is increased upon each position update (i.e. upon each iteration of method 10). Once a distance threshold is exceeded, method 10 returns the next point as a critical point in step 40 and the LBS application then sends this point to the server. This ensures that the server will receive frequent position updates for a mobile device, even if it is traveling in a straight line for an extended period of time. This can be viewed as a dynamic transition to the distance-based location update method.

In yet another embodiment, a probing sensor is added to method 10. In this embodiment, if the mobile device is probed by the server, method 10 determines the next point to be a critical point and returns the point to the application. The application then sends the point to the server. This can be viewed as a dynamic transition to a polling location-update method.

Implementation and Evaluation

The critical point method was implemented in TRAC-IT, a Java ME application that runs on GPS-enabled cell phones to automatically collect user travel behavior.

The JSR179 Location Application Programming Interfaces (API) was utilized to request location updates from a mobile phone. "Java Specification Request (JSR) 179: Location API for J2ME™," Sun Microsystems (2007), http://jcp.org/en/jsr/detail?id=179 (accessed Jun. 30, 2008). More information regarding the management of location retrieval using the JSR179 Location Listener can be found in "Location API 2.0 for J2ME—A New Standard in Location for JAVA-enabled Mobile Phones." S. Barbeau, M. Labrador, P. Winters, R. Pérez, N. Georggi, Computer Communications, Vol. 31, Issue 6, pp. 1091-1103 (2008).

A Sanyo SCP-7050 mobile phone with a Sanyo SCP-22LBPS 3.7V Lithium Ion 1000 milliampere-hour (mAh) battery on the Sprint-Nextel Code Division Multiple Access (CDMA) 1x Radio Transmission Technology (RTT) cellular network was utilized in testing.

Figure 5:
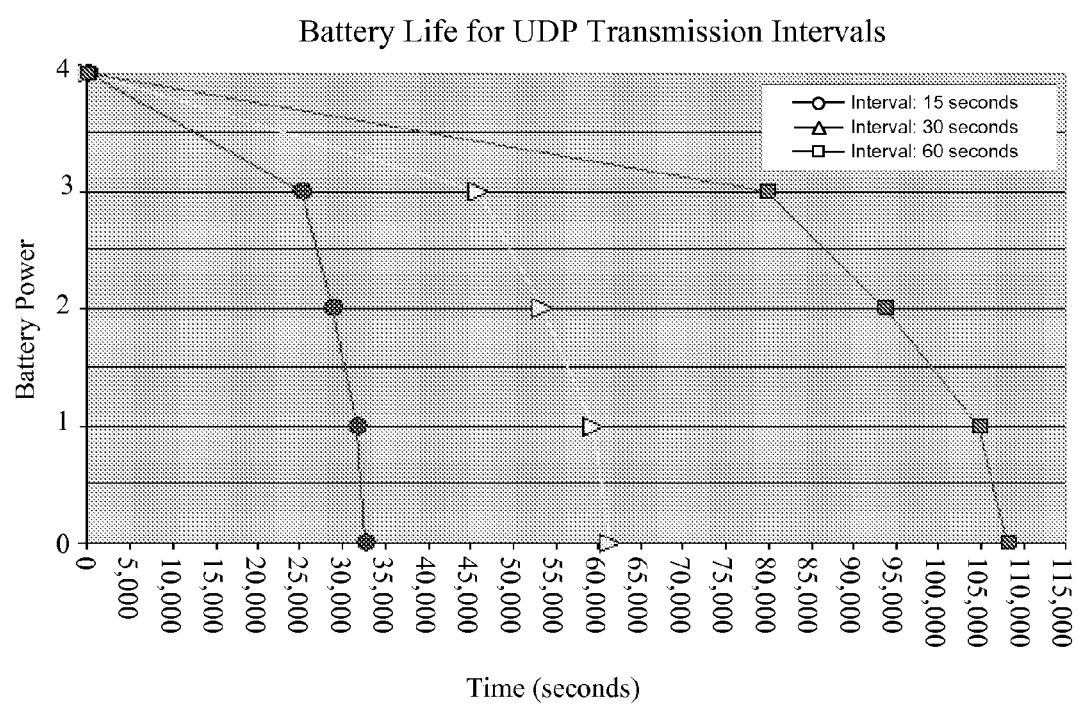
FIG. 5 is a graph comparing the battery life of a mobile phone for UDP transmission intervals of 15, 30, and 60 seconds in accordance with an embodiment of the present invention.

TRAC-IT was initially designed to transmit GPS fixes to a server periodically, every four seconds. However, while the user's route could accurately be determined, the massive amount of generated data consumed significant resources on the mobile device and the server. The graph shown in FIG. 5 illustrates the difference in device battery life for an application utilizing the User Datagram Protocol (UDP) to transmit GPS fixes to a server at fixed transmission intervals of fifteen, thirty, and sixty seconds until the device's battery was completely depleted. As the graph shows, battery life is directly proportional to the length of the transmission interval, meaning that less frequent wireless transmissions result in a significant increase in battery life. By increasing the interval from fifteen to thirty seconds, battery life is extended from approximately nine hours (28,400 seconds) to almost seventeen hours (61,200 seconds). If the interval is increased further to sixty seconds, battery life reaches approximately thirty hours (108,000 seconds).

FIGS. 6-8 demonstrate results obtained with the critical point method. FIGS. 6A and 7A show a series of LDPs along two different paths without the implementation of the critical point method. FIGS. 6B and 7B show a series of LDPs along the same two paths with the critical point method implemented. FIGS. 6 and 7 demonstrate that the critical point method is able to detect changes in the direction of the user, and establish critical points at appropriate places, as can be seen by the reduction in the number of LDPs and the absence of LDPs along relatively straight paths of travel when the critical point method is used.

The table of FIG. 8 provides quantitative results on eight different trips, and an estimate of the cost savings to the mobile device user produced by the critical point method. These results were obtained running the critical point method without any optional evaluations implemented. As shown in FIG. 8, on average, the critical point method sent less than 20% of the LDPs to the server.

As shown, a method is provided having improved capability and functionality over the prior art. The critical point method provides a reduction in the number of location fixes that a positioning system (or GPS)-enabled mobile device needs to transmit to a server, resulting in savings of energy and communication costs, while allowing the application to continuously track the mobile device in real-time.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall there between. Now that the invention has been described,

What is claimed is:

1. A method of identifying critical points in travel path of a mobile device, the method comprising:
  acquiring location data with a location positioning system of the mobile device to identify a travel path of the mobile device, the location data comprising a plurality of location data points;
  identifying a first critical point in the travel path of the mobile device;
  identifying a first location data point in the location data;
  determining a first azimuth value for the first critical point and the first location data point;

identifying a second location data point in the location data;

determining a second azimuth value for the first critical point and the second location data point;

determining a speed of the mobile device;

determining a mode of transportation of the mobile device based upon the speed of the mobile device;

setting an azimuth threshold value based at least in part upon the determined mode of transportation of the mobile device;

identifying the second location data point as a second critical point in the travel path of the mobile device if the absolute value of a difference between the first azimuth value and the second azimuth value is greater than the azimuth threshold value determined by the mode of transportation of the mobile device.

2. The method of claim 1, wherein the second location data point is identified as a non-critical point in the travel path of the mobile device if the absolute value of the difference between the first azimuth value and the second azimuth value is not greater than the azimuth threshold value determined by the mode of transportation of the mobile device.

3. The method of claim 1, wherein the azimuth threshold value increases as the speed of the mobile device decreases and the azimuth threshold value decreases as the speed of the mobile device increases.

4. The method of claim 1, wherein the first azimuth value is equal to an angle measurement between a projected vector extending between the first critical point and the first location data point relative to a reference vector and the second azimuth value is equal to an angle measurement between a projected vector extending between the first critical point and the second location data point relative to the reference vector.

5. The method of claim 1, wherein the plurality of location data points each comprise data selected from the group consisting of latitude, longitude, time-stamp information, altitude, estimated accuracy uncertainty, speed, heading and combinations thereof.

6. The method of claim 1, wherein the critical points are identified by the mobile device.

7. The method of claim 1, further comprising transmitting the critical points to an application server.

8. The method of claim 1, further comprising tracking a duration of time after the first critical point has been identified, and if the duration of time exceeds a predetermined threshold, identifying the second data location point as a second critical point.

9. The method of claim 1, further comprising tracking a distance traveled by the mobile device after the first critical point has been identified, and if the distance traveled exceeds a predetermined threshold, identifying the second data location point as a second critical point.

10. The method of claim 1, further comprising, polling the mobile device and upon polling the mobile device, identifying the second data location point as a second critical point.

11. The method of claim 1, wherein the mode of transportation is selected from the group consisting of walking, bicycling and driving.

12. The method of claim 1, wherein determining the mode of transportation of the mobile device further comprises:

establishing a maximum speed associated with a first mode of transportation;

establishing a maximum speed associated with a second mode of transportation, wherein the maximum speed for the second mode of transportation is greater than the maximum speed for the first mode of transportation;

comparing the speed of the mobile device to the maximum speed associated with the first mode transportation and determining the mode of transportation to be the first mode of transportation if the speed of the mobile device is less than the maximum speed of the first mode of transportation; and comparing the speed of the mobile device to the maximum speed associated with the second mode of transportation and determining the mode of transportation to be the second mode of transportation if the speed of the mobile device is less than the maximum speed associated with the second mode of transportation.

13. The method of claim 12, further comprising comparing the speed of the mobile device with the maximum speed associated with the second mode of transportation and determining the mode of transportation to be a third mode of transportation if the speed of the mobile device is greater than the maximum speed associated with the second mode of transportation.

14. The method of claim 12, wherein an azimuth threshold value associated with the first mode of transportation is greater than an azimuth threshold value associated with the second mode of transportation and the azimuth threshold value associated with the second mode of transportation is greater than an azimuth threshold value associated with the third mode of transportation.

15. A mobile device, comprising:

a positioning system, comprising a global positioning system device, configured to acquire location data for a travel path of the mobile device, the location data comprising a plurality of location data points;

a critical point identification system, comprising a processor, in communication with the positioning system, the critical point identification system configured to locate a first critical point in the travel path of the mobile device, to identify a first location data point in the location data, to determine a first azimuth value for the first critical point and the first location data point, to identify a second location data point in the location data, to determine a second azimuth value for the first critical point and the second location data point, to determine the speed of the mobile device, to determine a mode of transportation of the mobile device based upon the determined speed of the mobile device, to set an azimuth threshold value based at least in part upon the determined mode of transportation of the mobile device, and to identify the second location data point as a second critical point in the travel path of the mobile device if the absolute value of a difference between the first azimuth value and the second azimuth value is greater than the azimuth threshold value determined by the mode of transportation and if the speed of the mobile device is greater than a predetermined speed threshold value.

16. The mobile device of claim 15, wherein the azimuth threshold value increases as the speed of the mobile device decreases and the azimuth threshold value decreases as the speed of the mobile device increases.

17. The mobile device of claim 15, wherein the first azimuth value is equal to an angle measurement between a projected vector extending between the first critical point and the first location data point relative to a reference vector and the second azimuth value is equal to an angle measurement between a projected vector extending between the first critical point and the second location data point relative to the reference vector.

18. The mobile device of claim 15, wherein the plurality of location data points each comprise data selected from the group consisting of latitude, longitude, time-stamp information, altitude, estimated accuracy uncertainty, speed, heading and combinations thereof.

19. The mobile device of claim 15, further comprising a communication system in communication with the critical point identification system, the communication system to transmit the critical points to an application server.

20. A non-transitory, tangible computer readable storage medium bearing software instruction for enabling a computer to identify critical points in a travel path of a mobile device, the software instructions including instructions for:
acquiring location data for the travel path of the mobile device, the location data comprising a plurality of location data points;
identifying a first critical point in the travel path of the mobile device;
identifying a first location data point in the location data;
determining a first azimuth value for the first critical point and the first location data point;
identifying a second location data point in the location data;
determining a second azimuth value for the first critical point and the second location data point;
determining a speed of the mobile device;
determining a mode of transportation of the mobile device based upon the speed of the mobile device
setting an azimuth threshold value based at least in part upon the determined mode of transportation of the mobile device;
identifying the second location data point as a second critical point in the travel path of the mobile device if the absolute value of a difference between the first azimuth value and the second azimuth value is greater than the azimuth threshold value determined by the mode of transportation of the mobile device.

21. The computer readable storage medium of claim 20, wherein the second location data point is identified as a non-critical point in the travel path of the mobile device if the absolute value of the difference between the first azimuth value and the second azimuth value is not greater than the azimuth threshold value determined by the mode of transportation of the mobile device.

22. The computer readable storage medium of claim 20, wherein the azimuth threshold value increases as the speed of the mobile device decreases and the azimuth threshold value decreases as the speed of the mobile device increases.

23. The computer readable storage medium of claim 20, wherein the first azimuth value is equal to an angle measurement between a projected vector extending between the first critical point and the first location data point relative to a reference vector and the second azimuth value is equal to an angle measurement between a projected vector extending between the first critical point and the second location data point relative to the reference vector.

24. The computer readable storage medium of claim 20, wherein the plurality of location data points each comprise data selected from the group consisting of latitude, longitude, time-stamp information, altitude, estimated accuracy uncertainty, speed, heading and combinations thereof.

25. The computer readable storage medium of claim 20, further including instructions for transmitting the critical points to an application server.

26. The computer readable storage medium of claim 20, further including instructions for tracking a duration of time after the first critical point has been identified, and if the duration of time exceeds a predetermined threshold, identifying the second data location point as a second critical point.

27. The computer readable storage medium of claim 20, further including instructions for tracking a distance traveled by the mobile device after the first critical point has been identified, and if the distance traveled exceeds a predetermined threshold, identifying the second data location point as a second critical point.

28. The computer readable storage medium of claim 20, further including instructions for, upon polling the mobile device with an application server, identifying the second data location point as a second critical point.

29. The computer readable storage medium of claim 20, wherein the mode of transportation is selected from the group consisting of walking, bicycling and driving.

30. The computer readable storage medium of claim 20, wherein identifying the mode of transportation of the mobile device further comprises:
establishing a maximum speed associated with a first mode of transportation;
establishing a maximum speed associated with a second mode of transportation, wherein the maximum speed for the second mode of transportation is greater than the maximum speed for the first mode of transportation;
comparing the speed of the mobile device to the maximum speed associated with the first mode transportation and determining the mode of transportation to be the first mode of transportation if the speed of the mobile device is less than the maximum speed of the first mode of transportation; and
comparing the speed of the mobile device to the maximum speed associated with the second mode of transportation and determining the mode of transportation to be the second mode of transportation if the speed of the mobile device is less than the maximum speed associated with the second mode of transportation.

31. The computer readable storage medium of claim 30, further comprising comparing the speed of the mobile device with the maximum speed associated with the second mode of transportation and determining the mode of transportation to be a third mode of transportation if the speed of the mobile device is greater than the maximum speed associated with the second mode of transportation.

32. The computer readable storage medium of claim 30, wherein an azimuth threshold value associated with the first mode of transportation is greater than an azimuth threshold value associated with the second mode of transportation and the azimuth threshold value associated with the second mode of transportation is greater than an azimuth threshold value associated with the third mode of transportation.

33. The method of claim 1 wherein the location data acquired with the location positioning system of the mobile device is transmitted to an application server and the steps of identifying a first critical point in the travel path of the mobile device, identifying a first location data point in the location data, determining a first azimuth value for the first critical point and the first location data point, identifying a second location data point in the location data, determining a second azimuth value for the first critical point and the second location data point, determining a speed of the mobile device, determining a mode of transportation of the mobile device based upon the speed of the mobile device, setting an azimuth threshold value based at least in part upon the determined mode of transportation of the mobile device, and identifying the second location data point as a second critical point in the travel path of the mobile device if the absolute value of a difference between the first azimuth value and the second azimuth value is greater than the azimuth threshold value determined by the mode of transportation of the mobile device are performed by the application server.

* * * * *